(12) United States Patent (10) Patent No.: US 8,660,253 B2
Millard et al. (45) Date of Patent: Feb. 25, 2014

(54) SYSTEM AND METHOD FOR PROVIDING LOCATION INFORMATION

(71) Applicant: AT&T Intellectual Property I, L.P., Atlanta, GA (US)

(72) Inventors: Michael Millard, Round Rock, TX (US); Ryan McKenney, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/872,215

(22) Filed: Apr. 29, 2013

(65) Prior Publication Data

US 2013/0231142 A1 Sep. 5, 2013

Related U.S. Application Data

(63) Continuation of application No. 11/725,577, filed on Mar. 19, 2007, now Pat. No. 8,451,998.

(51) Int. Cl.
*H04M 3/42* (2006.01)

(52) U.S. Cl.
USPC ............ 379/207.12; 379/207.13; 379/207.14; 379/207.15; 455/446; 455/457; 455/566

(58) Field of Classification Search
USPC ............... 379/142.1, 142.11, 207.12, 207.15; 455/404.2, 414.2, 415, 433, 456.1–457
See application file for complete search history.

(56) References Cited

U.S. PATENT DOCUMENTS

| | | | |
|---|---|---|---|
| 5,539,809 A | 7/1996 | Mayer et al. | |
| 5,737,700 A | 4/1998 | Cox et al. | |
| 6,185,426 B1 | 2/2001 | Alperovich et al. | |
| 6,317,605 B1 | 11/2001 | Sakuma | |
| 6,353,664 B1 | 3/2002 | Cannon et al. | |
| 6,477,363 B1 | 11/2002 | Ayoub et al. | |
| 6,535,743 B1 | 3/2003 | Kennedy, III et al. | |
| 6,674,849 B1 | 1/2004 | Froeberg | |
| 6,795,698 B1 | 9/2004 | Kumor | |
| 6,853,911 B1 | 2/2005 | Sakarya | |
| 7,099,921 B1 | 8/2006 | Engstrom et al. | |
| 2003/0008671 A1 | 1/2003 | Lundgren et al. | |
| 2003/0013461 A1 | 1/2003 | Mizune et al. | |
| 2003/0032436 A1 | 2/2003 | Mikuni | |
| 2004/0041911 A1 | 3/2004 | Odagiri et al. | |
| 2004/0203901 A1 | 10/2004 | Wilson et al. | |
| 2005/0143096 A1 | 6/2005 | Boesch | |
| 2005/0286702 A1 | 12/2005 | Yin et al. | |
| 2006/0234726 A1 | 10/2006 | Ashley, Jr. et al. | |
| 2006/0244638 A1 | 11/2006 | Lettau | |
| 2006/0252431 A1 | 11/2006 | Mullen | |
| 2007/0026852 A1 | 2/2007 | Logan et al. | |
| 2007/0150186 A1 | 6/2007 | Ingulsrud | |

(Continued)

OTHER PUBLICATIONS

Hughes, "7101 User Manual," Thuraya Satellite Telecommunications Company, www.thuraya.com, Nov. 1, 2004, 77 pages.

(Continued)

*Primary Examiner* — Joseph J Nguyen
(74) *Attorney, Agent, or Firm* — Toler Law Group, PC (57) ABSTRACT

In a particular embodiment, a method includes presenting, at a first communication device, first location information after an incoming communication is answered. The first location information corresponds to a first location of the first communication device. The method further includes presenting updated first location information, at the first communication device, prior to the incoming communication being terminated.

10 Claims, 4 Drawing Sheets

(56) References Cited

U.S. PATENT DOCUMENTS

2008/0045138 A1 2/2008 Milic-Frayling et al.
2008/0084347 A1 4/2008 Fay
2008/0232571 A1 9/2008 Millard et al.

OTHER PUBLICATIONS

"Caller ID," retrieved from http://en.wikipedia.org/w/index.php?title=Caller_ID&printable=yes on Feb. 6, 2007, 6 pages.

SYSTEM AND METHOD FOR PROVIDING LOCATION INFORMATION

CLAIM OF PRIORITY

This application is a continuation of, and claims priority from U.S. patent application Ser. No. 11/725,577, filed Mar. 19, 2007, and entitled "SYSTEM AND METHOD FOR PROVIDING LOCATION INFORMATION," which is hereby incorporated by reference in its entirety.

FIELD OF THE DISCLOSURE

The present disclosure is generally related to systems and methods for providing location information.

BACKGROUND

Calling number identification services may send a signal including the telephone number of the calling telephone to a called telephone. The telephone number of the calling telephone may give the called party information about the call or about the calling party prior to the called party answering the call. However, with the rise of mobile communication devices, the telephone number of the calling telephone may not provide as much information as the called party would like to have about the call or about the calling party. Hence, there is a need for an improved system and method of providing location information.

DETAILED DESCRIPTION OF THE DRAWINGS

In a particular embodiment, a system for providing location information may include a communication device. The communication device may include a communication interface to receive a notice of an incoming communication. The communication device may also include a display to display a representation of a present location of a calling party and to display a representation of a location of the communication device.

In a particular embodiment, a method of providing location information may include receiving notification of an incoming communication at a communication device associated with a called party. The method may also include receiving location data indicating a present location of a calling party. The method may further include displaying a representation of the present location of the calling party at the communication device. The method may also include displaying a representation of a location of the called party at the communication device.

In a particular embodiment, a computer readable medium may include computer readable instructions. The computer readable instructions may be executable by a computer to provide location information. The computer readable instructions may be executable to receive notification of an incoming communication at a communication device associated with a called party. The computer readable instructions may also be executable to receive location data indicating a location of a calling party. The computer readable instructions may further be executable to generate a display at the communication device. The display may include a representation of the location of the calling party and a representation of a location of the communication device.

Figure 1:
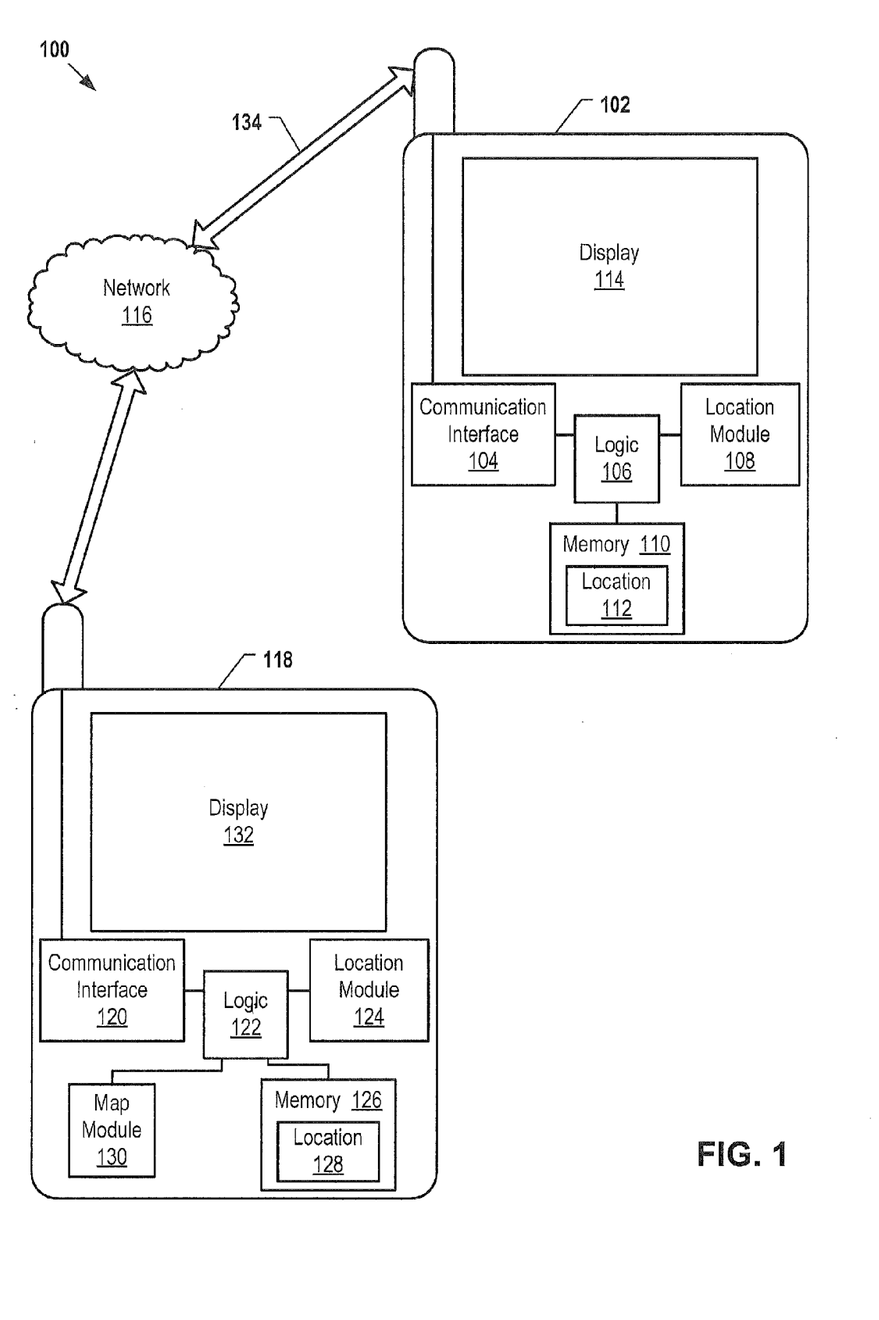
FIG. 1 is a block diagram of a particular embodiment of a system to provide location information.

FIG. 1 is a block diagram of a particular embodiment of a system to provide location information, generally designated 100. The system 100 includes a first communication device 102 and a second communication device 118. The first communication device 102 and the second communication device 118 communicate via a communication network 116. The communication network 116 may include, for example, a wireless communication network, such as a cellular telephone network, a wired communication network, such as a public switched telephone network (PSTN) or the Internet, any other communication network, or any combination thereof.

In a particular embodiment, the first communication device 102 includes a communication interface 104, a location module 108, and a memory 110. The communication interface 104, the location module 108, and the memory 110 may communicate with logic 106. Additionally, the first communication device 102 may include a display 114.

In a particular embodiment, the second communication device 118 may include a communication interface 120, a location module 124, and memory 126. The communications interface 120, a location module 124 and the memory 126 may communicate with logic 122. Additionally, the communication device 118 may include a display 132. The second communication device 118 may also include a map module 130.

In operation, the communication interfaces 104 and 120 may send and receive communication signals 134 via the communications network 116. For example, the communication interface 104 may send data, voice, video, or other signals via the communication network 116 to the second communication interface 120. In a particular embodiment, the communication interface 104 and 120 may be implemented using hardware, software, or any combination thereof.

In a particular embodiment, the location module 108 may be operable to determine the location of the first communication device 102, and the location module 124 may be operable to determine the location of the second communication device 118. In an illustrative embodiment, the location modules 108, 124 may be global positioning system (GPS) devices, local positioning system devices, other location determining devices, or any combination thereof. In a particular embodiment, the location modules 108 and 124 may be implemented using hardware, software, or any combination thereof. In a particular illustrative embodiment, one or both of the communication devices 102, 118 may be a primarily stationary device. For example, the first communication device 102 may be a primarily stationary device, such as a wired telephone, and the location 112 of the first communication device 102 may be stored in the memory 110. Similarly, in a particular illustrative embodiment, the second communication device 118 may be a primarily stationary communication device, and the location 128 of the second communication device 118 may be stored in the memory 126.

In a particular embodiment, the communication devices 102 and 118 may be adapted to send location information during a setup of a call. For instance, the first communication device 102 may send location information via the communication network 116 when a call is initiated at the first communication device 102. The location module 108 may determine the location of the first communication device 102 when the communication is initiated. The location module 108 may provide the location information to the communication interface 104, or the communication interface 104 may access the location information in the memory 110. The communication interface 104 may transmit the location information to the communication network 116. The location information may be processed by the communication network 116 and transmitted to the second communication device 118 along with call notification information, such as caller identification (caller id.) information.

In a particular embodiment, the second communication device 118 may be adapted to receive the location information from the communication network 116. For example, the second communications device 118 may receive notification of an incoming communication and may receive location data with the notification of the incoming communication. The location information may indicate the location of the calling party using the first communication device 102. In a particular embodiment, the second communication device 118 may be configured to display a representation of the location of the calling party at the display 132. In a particular illustrative embodiment, the representation of the location of the calling party may be displayed automatically, for example, in response to receiving the notification of the incoming communication or in response to receiving the location information. The representation of the location of the calling party may include a city, a state, a country, a coordinate position, any other representation of the location of the calling party, or any combination thereof. In a particular illustrative embodiment, the representation of the location of the calling party may include a map indicating the location of the calling party. For example, the map module 130 may generate a graphical representation of the location of the calling party in the form of a map with the location of the calling party indicated on the map.

In a particular embodiment, the second communication device 118 may display a representation of the location of the called party. For example, after receiving notification of an incoming communication, the location module 124 may determine the location of the second communication device 118. In an illustrative embodiment, the representation of the location of the called party may be displayed automatically, in response to receiving the notification of the incoming communication, in response to receiving the location information, or in response to the communication being answered. In a particular embodiment, the map module 130 may access the location of the second communication device from location module 124 or from the memory 126. The second communication device 118 may display the location of the called party and the location of the calling party on a same map.

In a particular embodiment, the second communication device 118 may display data indicating a distance between the calling party and the called party at the display 132. In an illustrative embodiment, the distance between the calling party and the called party may be represented as an estimated travel time. For example, the map module 130 may estimate travel time based on map data related to the location of the parties, a rate at which the distance between the parties is changing, speed limits or other limitations on streets between the parties, or any combination thereof. In another illustrative embodiment, the distance between the parties may be determined as a physical point-to-point distance.

In a particular embodiment, the second communication device 118 may display additional information related to the locations of the calling party and the called party. In an illustrative embodiment, the second communication device 118 may display travel directions from the called party to the calling party at the display 132. In another illustrative embodiment, the second communication device 118 may display reverse travel directions; that is, travel directions from the calling party to the called party, at the display 132.

In a particular embodiment, the second communication device 118 may display the representation of the location of the calling party along with caller id. information before the communication is answered. In a particular illustrative embodiment, the second communication device 118 may display the representation of the location of the called party after the communication is answered. In another illustrative embodiment, the second communication device 118 may be configured to display the representation of the location of the calling party and the representation of the location of the called party concurrently. For example, the second communication device 118 may display both the representation of the location of the calling party and the representation of the location of the called party before the communication is answered. In another example, the second communication device 118 may display both the representation of the location of the calling party and the representation of the location of the called party after the communication is answered.

In a particular embodiment, the logic 122 may, in response to user input, send a trace route command to the communication network 116. In response to the trace route command, the communication network 116 may identify information about the communication path taken by the incoming communication to reach the second communication device 118. For example, the communication network 116 may identify an base transceiver station of the communication network 116 that is in communication with the first communication device 102, a local telephone exchange device that is in communication with the first communication device 102, another element of the communication network 116 that is in communication with the first communication device 102 or that routed the incoming communication from the first communication device 102 to the second communication device 118, or any combination thereof.

Figure 2:
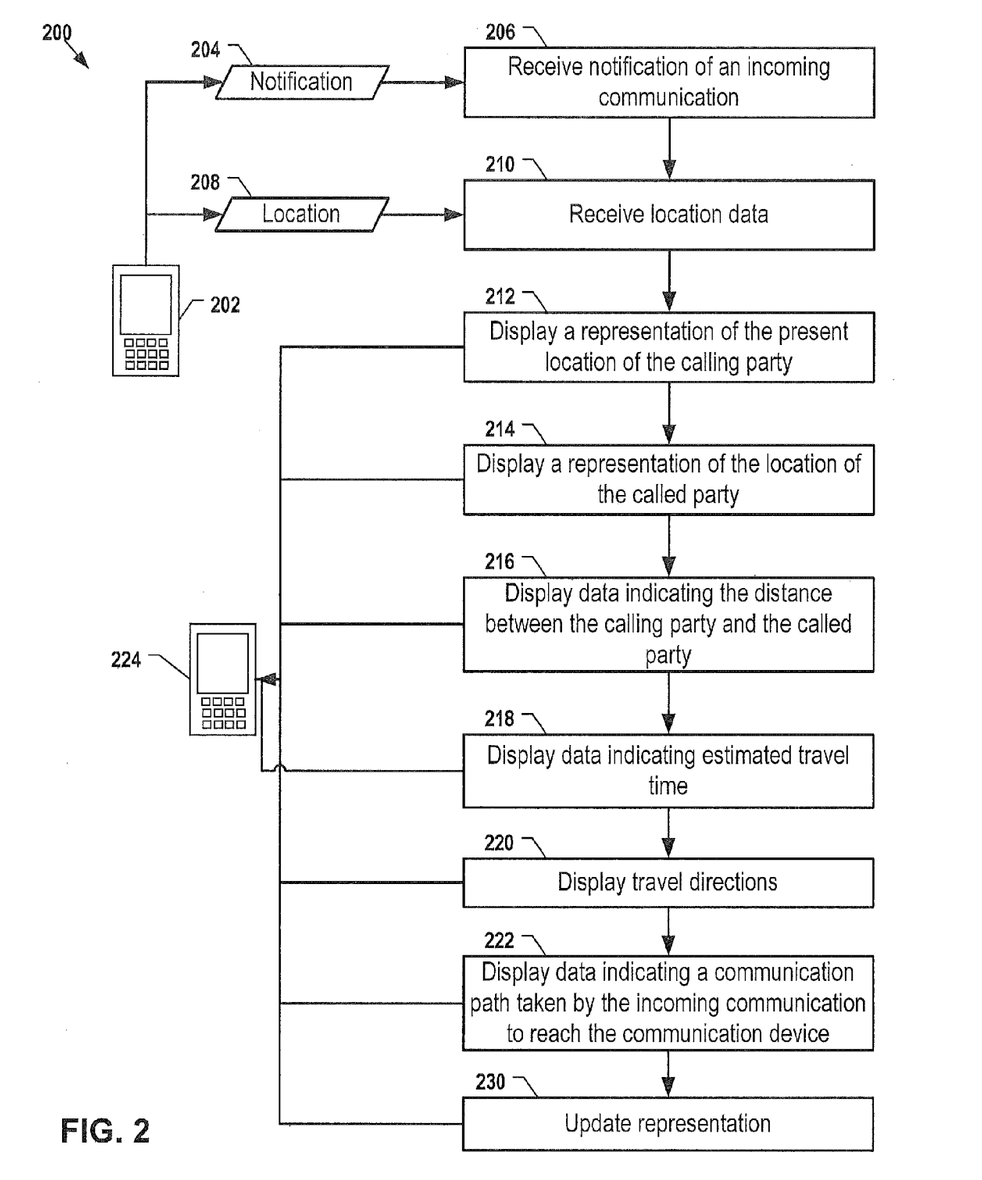
FIG. 2 is a flow chart of a particular embodiment of a method of providing location information.

FIG. 2 is a flow diagram of a particular embodiment of a method of providing location information, generally designated 200. The method 200 includes, at 206, receiving a notification 204 of an incoming communication. For example, the incoming communication may be received from a communication device 202 via a communication network.

The method 200 also includes, at 210, receiving location data 208. For example, the location data 208 may be received from the communication device 202 via the communication network.

In a particular embodiment, the method 200 includes, at 212, displaying a representation of the location of the calling party. For example, the method may include displaying a map indicating the location 208 received from the first communication device 202. In a particular embodiment, the method 200 may include, at 214, displaying a representation of the location of the called party. For example, the method 200 may include determining the location of a receiving communication device 224 associated with the called party. If the communication device associated with the called party is a substantially stationary communication device, such as a wire line telephone, the method 200 may include determining the location of the called party based on a known location of the receiving communication device 224. In a particular illustrative embodiment, the substantially stationary communication device may include a memory that stores location data related to the communication device.

In a particular embodiment, the method 200 may include displaying additional information related to the locations of the calling parties. In an illustrative embodiment, the method 200 may include, at 216, displaying data indicating the distance between the called party and the calling party. In another illustrative embodiment, the method 200 may include, at 218, displaying data indicating estimated travel time from the called party to the calling party. In another illustrative embodiment, the method 200 may include, at 220, displaying travel directions. The travel directions may indicate a route from the called party to the calling party, or a route from the calling party to the called party. In another illustrative embodiment, the method 200 may include, at 222, displaying data indicating a communication path taken by the incoming communication to reach the receiving communication device 224. For example, the method may include implementing a trace route method to determine routing devices or other network devices of the communication network involved in routing the communication from the communication device 202 to the receiving communication device 224.

In a particular embodiment, the method 200 may also include, at 230, updating the representation of the location of the calling party or the representation of the location of the called party. In a particular illustrative embodiment, the first communication device 202 may provide updated location data 208 to update the representation of the location of the calling party. The first communication device 202 may send the updated location data 208 automatically or in response to input from a user of the first communication device 202. In another particular illustrative embodiment, the representation of the location of the called party may be updated based on a movement of the second communication device 224. The representation of the location of the called party or the calling party may be updated before the incoming communication is answered, after the communication is answered but before the communication is terminated (e.g., during a telephone conversation), after the communication is terminated, or any combination thereof.

Figure 3:
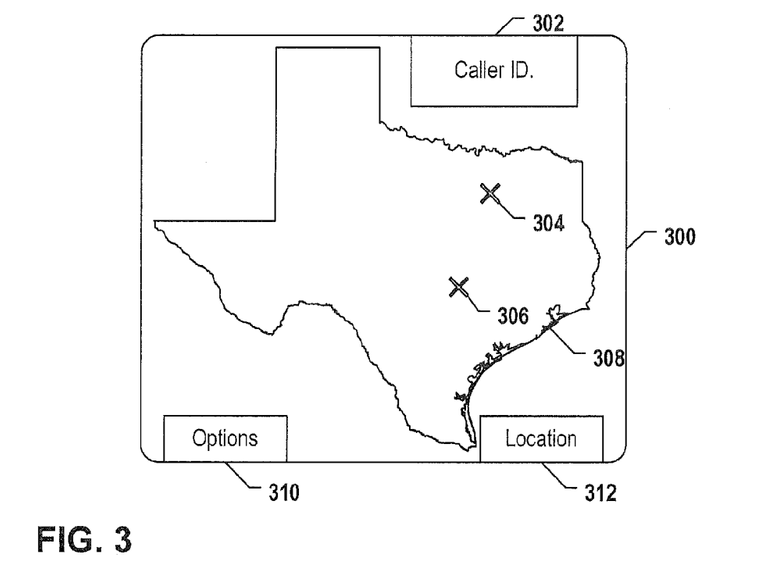
FIG. 3 is a diagram of a first particular embodiment of a user interface to display location information.

FIG. 3 is a diagram of a first particular embodiment of a user interface to display location information, generally designated 300. The display screen 300 includes a representation of a location of a calling party 304. The display screen 300 also includes a representation of a location of a called party 306. The display screen 300 also includes information identifying the calling party, such as caller I.D. information 302.

In a particular embodiment, the display screen 300 may include a map 308. The location of the calling party 306 and the location of the called party 304 may be indicated on the map 308.

In a particular embodiment, the display screen 300 may include a text location description 312 describing the location of the calling party, the called party or both. For example, the location description 312 may include a city, a state, a country, any other location description, or any combination thereof. In another particular illustrative embodiment, the location description 312 may include a coordinate position of the calling party, the called party, or both. In another particular illustrative embodiment, the location description 312 may include travel directions or reverse travel direction between the called party and the calling party. In another particular illustrative embodiment, the location description 312 may include an estimated travel time.

In a particular embodiment, display screen 300 may also include an options selection soft button 310. The options selection soft button 310 may allow a user to display additional information regarding the locations of the calling party and the called party. For example, selecting the options selection soft button 310 may initiate a location menu as described with reference to FIG. 4.

Figure 4:
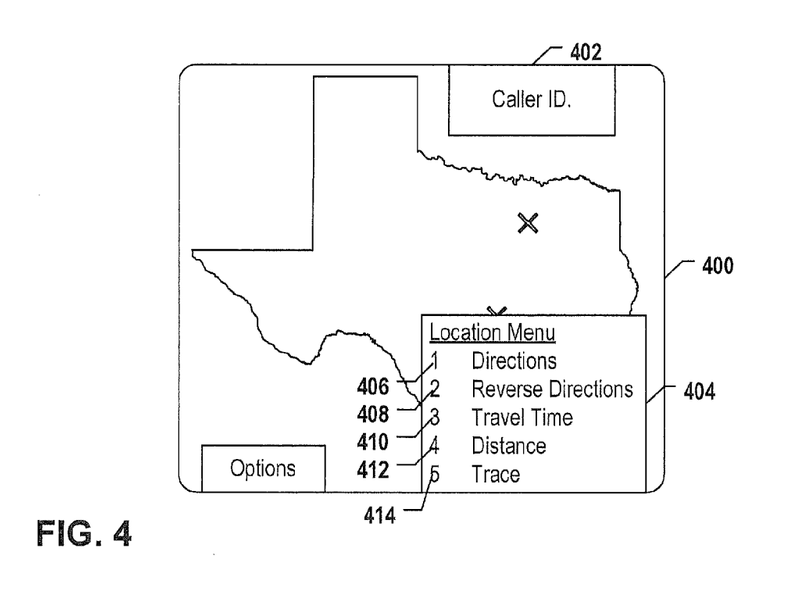
FIG. 4 is a diagram of a second particular embodiment of a user interface to display location information.

FIG. 4 is a diagram of a second particular embodiment of a user interface to display location information, generally designated 400. In a particular embodiment, the display screen 400 includes information about the identity of the caller, such as caller I.D. information 402. The display screen also includes a location menu 404. The location menu 404 includes a plurality of user selectable menu items. For example, the menu items may include a directions selection 406, a reverse directions selection 408, a travel time selection 410, a distance selection 412, a trace route selection 414, other selections or any combination thereof.

In a particular embodiment, selecting the directions selection 406 may cause the display 400 to include directions for traveling from the called party to the calling party. In an illustrative embodiment, the travel directions may include driving directions indicating, for example, turns to be taken along roadways. In another example, travel directions may include walking directions. The travel directions may be presented graphically, e.g., on a map, in text, or any combination thereof. Additionally, the travel directions may be driving directions or walking directions. For example, if the distance between the called party and the calling party is greater than a predetermined distance (e.g., about 0.1 miles, 0.25 miles, 0.5 miles, 1 mile, 2 miles, etc.) the driving travel directions may be presented. If the distance between the parties is less than the predetermined distance, the walking travel directions may be presented.

In a particular embodiment, selecting the reverse travel direction selection 408 may cause the display 400 to include reverse travel directions, i.e., travel directions from the calling party to the called party. The reverse travel directions may include for example, driving directions or walking directions. The reverse travel directions may be presented graphically, in text or as any combination thereof.

In a particular embodiment, selecting the travel time selection 410 may cause the display 400 to include estimated travel time from the called party to the calling party or from the calling party to the called party. The estimated travel time may be determined based on driving or walking. For example, if the distance between the called party and the calling party is greater than a predetermined distance (e.g., about 0.1 miles, 0.25 miles, 0.5 miles, 1 mile, 2 miles, etc.) the estimated travel time may be presented as driving directions. If the distance between the parties is less than the predetermined distance, the estimated travel time may be presented based on walking. In a particular illustrative embodiment, the estimated travel time may take into account actual traffic conditions, actual weather conditions, other travel factors or any combination thereof.

In a particular embodiment, selecting the distance selection 412 may cause the display 400 to provide distance information regarding the distance between the called party and the calling party. In an illustrative embodiment, the distance information may include travel distance, e.g., distance required to travel from the called party to the calling party or the calling party to the called party along identified roadways. In another illustrative embodiment, the distance may include the estimated direct point-to-point distance, e.g., the distance "as the bird flies", between the called party and the calling party.

In a particular embodiment, selecting the trace selection 414 may cause the display 400 to provide information regarding the route taken by the incoming communication to reach the communication device. For example, the trace information may include an identification of one or more routers, an identification one or more local telephone exchange offices, an identification of one or more network devices, or any combination thereof.

In conjunction with the configuration of structure described herein, the systems and methods disclosed provide location information. In a particular illustrative embodiment, a notification of an incoming communication is received at a communication device. Location data related to a calling party is also received at the communication device. The communication device displays a representation of the location of the calling party and a representation of a location of called party at a display of the communication device.

Figure 5:
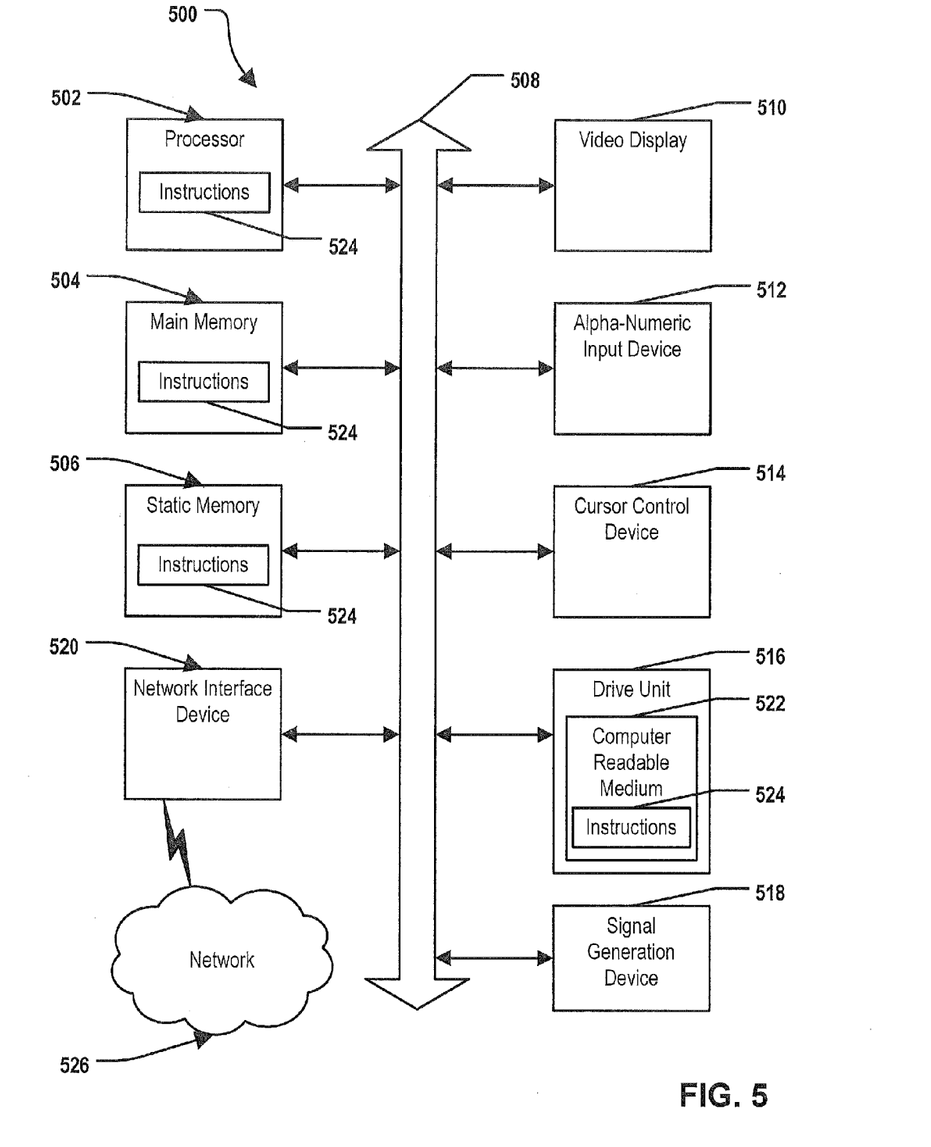
FIG. 5 is a block diagram of an illustrative embodiment of a computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. In an illustrative embodiment, the computer system 500 may include any one or more of the communication devices, display devices or network devices depicted in FIGS. 1 and 2.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506, that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g., software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
presenting, at a first communication device, first location information after an incoming communication is answered, wherein the first location information corresponds to a first location of the first communication device;
presenting, at the first communication device, updated first location information prior to the incoming communication being terminated, wherein the updated first location information is based on a change in location of the first communication device from the first location to a second location;
updating the updated first location information based on a second change in location of the first communication device to a third location to produce second location information;
presenting, at the first communication device, third location information that corresponds to a fourth location of a second communication device associated with the incoming communication; and
presenting, at the first communication device, the second location information after the incoming communication is terminated, wherein the second location information is presented concurrently with the third location information.

2. The method of claim 1, wherein the first location information is presented in response to the incoming communication being answered.

3. The method of claim 1, further comprising receiving a notification of the incoming communication at the first communication device, wherein the incoming communication is initiated by the second communication device.

4. The method of claim 1, wherein presenting the first location information comprises presenting a first map that includes a first identifier based on the first location information.

5. The method of claim 4, further comprising presenting, at the first communication device, a second map that includes a second identifier based on the third location information corresponding to the second communication device, wherein the second map is presented before the incoming communication is answered.

6. The method of claim 4, wherein presenting the updated first location information comprises updating the first map.

7. The method of claim 1, further comprising receiving location data corresponding to the third location of the second communication device associated with the incoming communication.

8. The method of claim 7, further comprising presenting, at the first communication device, fourth location information based on the location data, wherein the fourth location information is presented before the incoming communication is answered.

9. A computer-readable storage device storing processor-executable instructions that, when executed by a processor, cause the processor to perform operations comprising:
presenting, at a first communication device, first location information after an incoming communication is answered and during the incoming communication, wherein the first location information corresponds to a first location of the first communication device;
presenting, at the first communication device, second location information prior to the incoming communication being terminated, wherein the second location information is based on a change in location of the first communication device from the first location to a second location;
updating the second location information based on a second change in location of the first communication device from the second location to a third location;

presenting, at the first communication device, third location information that corresponds to a fourth location of a second communication device associated with the incoming communication; and presenting, at the first communication device, updated second location information after the incoming communication is terminated, wherein the updated second location information is presented concurrently with the third location information.

10. The computer-readable storage device of claim 9, wherein the first location information is presented in response to the incoming communication being answered.

* * * * *